United States Patent
Psaros et al.

[11] Patent Number: 5,558,087
[45] Date of Patent: Sep. 24, 1996

[54] DEVICE FOR REDUCING THE RELATIVE HUMIDITY OF A FLOWING GAS

[75] Inventors: Georgios Psaros, Tullinge; Marie Johansson, Kista, both of Sweden

[73] Assignee: Siemens Elema AB, Solna, Sweden

[21] Appl. No.: 395,476

[22] Filed: Feb. 28, 1995

[30] Foreign Application Priority Data

Mar. 24, 1994 [SE] Sweden ................... 9400991

[51] Int. Cl.$^6$ ........................................ A62B 7/00
[52] U.S. Cl. ............... 128/205.12; 128/200.24; 128/204.16; 128/205.27; 128/205.29
[58] Field of Search ............ 128/205.12, 205.27, 128/200.24, 201.13, 204.15, 204.16, 204.17, 205.29, 204.22, 204.23; 95/117, 118, 119, 121; 96/130, 131, 132, 188, 189; 34/80, 81, 72; 62/93, 94; 55/421, DIG. 17

[56] References Cited

U.S. PATENT DOCUMENTS

| | | | |
|---|---|---|---|
| 4,015,959 | 4/1977 | Grote | 55/274 |
| 4,274,844 | 6/1981 | Baughman et al. | 55/196 |
| 5,131,387 | 7/1992 | French et al. | |
| 5,148,613 | 9/1992 | Cullen | 34/81 |

FOREIGN PATENT DOCUMENTS

| | | | |
|---|---|---|---|
| 0535379 | 4/1993 | European Pat. Off. | |
| 2224957 | 5/1990 | United Kingdom | 128/205.12 |

Primary Examiner—Edgar S. Burr
Assistant Examiner—V. Srivastava
Attorney, Agent, or Firm—Hill, Steadman & Simpson

[57] ABSTRACT

A dehumidifying device is often used to protect measurement equipment from condensation during measurements of a flowing gas. A dehumidifying device which does not need to be replaced as a result of becoming moisture-saturated is achieved by a container filled with a hydrophilic material and connected to a moisture permeable element. When a gas flows through the device via an inlet, a flow channel and an outlet, the hydrophilic material absorbs moisture from the flowing gas. The absorbed moisture is released into ambient air via the moisture permeable element.

10 Claims, 1 Drawing Sheet

DEVICE FOR REDUCING THE RELATIVE HUMIDITY OF A FLOWING GAS

BACKGROUND OF THE INVENTION

1. Field of the Invention

The present invention relates to a device for reducing the relative humidity of a flowing gas which is warmer than ambient air, such as gas expired by a living subject, of the type having an inlet, a container filled with a hydrophilic material, and a flow channel for the flowing gas, the flow channel passing through the container to dehumidify the flowing gas, and an outlet.

2. Description of the Prior Art

Air (gas) expired by a person is generally saturated with water vapor and has a relatively high temperature, about 33°–34° C. In many situations, expired air is subjected to different measurements, e.g., during the ventilation of a patient, administration of anesthesia or specimen-taking. Measurements can concern, e.g., expired gas flow, analysis of component gases, etc. Most measurement instruments are then susceptible to the formation of condensation. Since the instruments are generally in an environment colder than the temperature of the expired air, the risk of condensation is very high. Various types of dehumidifying devices have therefore been designed to capture or remove water vapor from the expired air without affecting the flow or composition of the gas.

One known device is described in U.S. Pat. No. 5,131,387. The device is formed by a container filled with a hydrophilic material in which a flow channel is arranged for the expired air. The hydrophilic material absorbs moisture as the moist expired gas flows past. A rod of hydrophilic material can also be arranged in the flow channel in order to improve moisture absorption.

A disadvantage of this known device is that it can only absorb a limited amount of moisture before it must be replaced. The replacement of the moisture-reducing device has two major disadvantages. Firstly, moisture absorption must be continuously monitored so that measurement or other functions are not interrupted when the moisture-absorbing material becomes saturated with moisture. Secondly, ambient air could be sucked into the gas system and affect measurements when the device is replaced. When anesthesia is being administered, anesthetic gas could also leak into the operating room when such a known moisture-absorbing device is replaced.

Another known type of dehumidifier is described in European Application 535 379. This dehumidifier is composed of a plurality of tubes, permeable to moisture, through which expired air passes. As a result of the difference in relative humidity between expired air and ambient air, moisture passes through the permeable tubes and is discharged into ambient air. This thereby reduces the relative humidity of expired air. The dehumidifier can be connected to existing tube systems and does not have to be replaced during its service life. The efficiency of this dehumidifier is due in part to the total area, permeable to moisture, and, in particular, the length of the permeable tubes. In certain situations, achieving a major reduction in relative humidity without extending the total length of tubing in the tube system is very desirable. A more compact dehumidifier than the described type would then be preferable in those circumstances.

SUMMARY OF THE INVENTION

It is an object of the present invention to provide a dehumidifying device, suitable for reducing the relative humidity of a flowing gas expired by a living subject, which does not require repeated replacement of the hydrophilic material due to saturation thereof with moisture, and which does not appreciably extend the total length of tubing in the system in which the dehumidifier device is used.

The above object is achieved in accordance with the present invention in a dehumidifying device of the type generally initially described wherein at least one moisture permeable element is connected to the container and provides communication of the hydrophilic material, at least in part, to the ambient atmosphere, whereby moisture absorbed by the hydrophilic material from the flowing gas is discharged into ambient air through the moisture permeable element.

When moisture permeable elements are connected to the hydrophilic material, moisture absorbed by the hydrophilic material diffuses through the permeable material into the ambient atmosphere, which is generally much dryer than e.g., air expired by a patient. In this manner, a device is achieved which is able to dehumidify a flowing gas for an optional period of time, and which is self-evacuating.

It is advantageous if the flow channel has a total flow-through area which is adapted to the flow-through area of the inlet and the outlet and arranged within the container so that the hydrophilic material receives maximum exposure to the flowing gas without impeding the flow of the flowing gas.

Moisture absorption by the hydrophilic material becomes more effective when a larger part of the material comes into direct contact with the flowing gas. By adapting the flow-through area of the flow channel, flow measurement after the device will not be affected.

In one embodiment of the device, a large contact surface between the flowing gas and the hydrophilic material is achieved in accordance with the invention by means of the container being cylindrical, with a first defined diameter, the hydrophilic material being cylindrical with a second defined diameter, which is smaller than the first defined diameter, and the hydrophilic material being arranged in the center of the container. A gap, surrounding the hydrophilic material, is thus formed between the wall of the container and the hydrophilic material, this gap constituting the flow channel.

With a device of this design, expired gas passes the hydrophilic material through two semicircular gaps. This results in a large contact surface between the flowing gas and the hydrophilic material and, accordingly, improved moisture exchange between the flowing gas and the hydrophilic material, as described above.

It is advantageous for the hydrophilic material to be secured in the center of the container with two O-rings, located between the hydrophilic material and the wall of the container at each end of the hydrophilic material. This provides a durable, non-leaking seat for the hydrophilic material.

In an embodiment of the device in accordance with the invention, the permeable element is shaped so the surface which releases moisture into ambient air is larger than the surface which is attached to the container.

The permeable element can thereby release larger amounts of moisture into ambient air. The hydrophilic material will accordingly dry more rapidly, thereby being able to sustain a high moisture absorption capacity.

In this embodiment, it is advantageous for the permeable element to be formed by at least one tube, permeable to moisture, which is connected at least at one end to the container.

With a permeable tube, the surface through which moisture is released into ambient air can be made as large as desired and can thereby emit the desired amount of moisture. Such a tube can be connected at one end to the container, and its other end can dangle freely. The unconnected end should then appropriately be plugged. Such a tube can alternatively be connected at both ends to the container, thereby forming a closed loop under the container.

In an embodiment of the device according to the invention, the tube is filled with silica gel.

Silica gel has very good moisture-absorption properties, and moisture absorbed by the hydrophilic material is drawn down into the tube filled with silica gel and subsequently discharged through the permeable material. The rapid and effective removal of moisture achieves a major reduction in relative humidity.

The permeable tube or tubes is (are) appropriately shielded with a protective hood around the permeable element and provided with openings to permit the exchange of air with the ambient atmosphere.

Preferably the hydrophilic material consists of a ceramic.

Alternately, silica gel can be used as the hydrophilic material. As noted above, this substance has very considerable hydrophilic properties, and the drop in relative humidity would then be larger than with the use of ordinary ceramic metals.

For effective use in ventilation, intensive care and anesthesia, the device should appropriately be made of materials capable of withstanding autoclaving.

DESCRIPTION OF THE PREFERRED EMBODIMENTS

Figure 1:
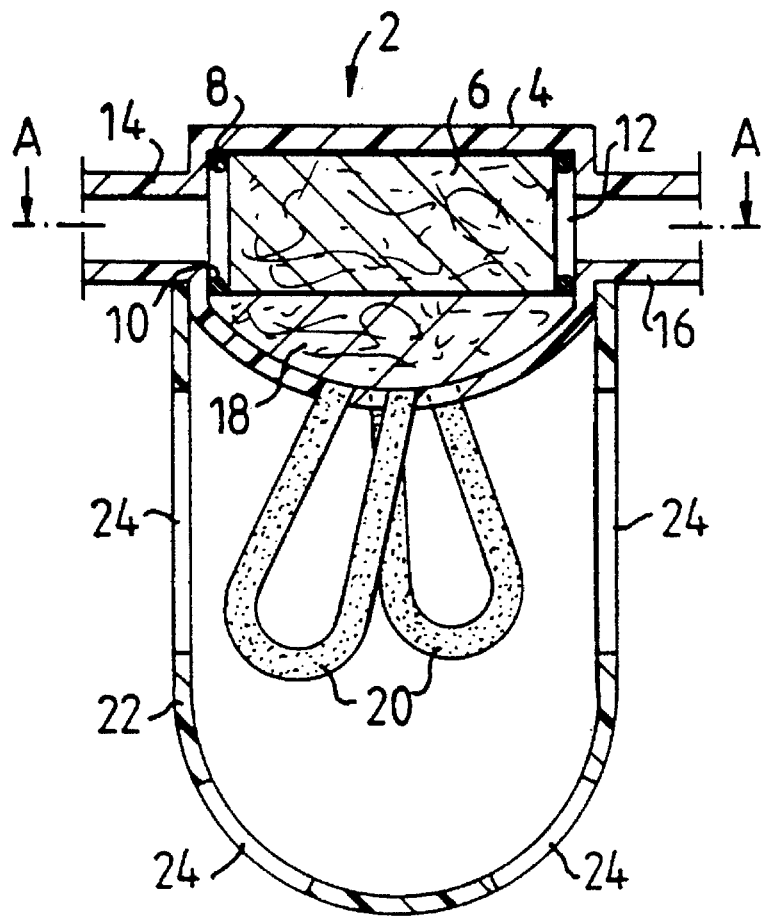
FIG. 1 is a side sectional view of a dehumidifying device constructed in accordance with the principles of the present invention.
Figure 2:
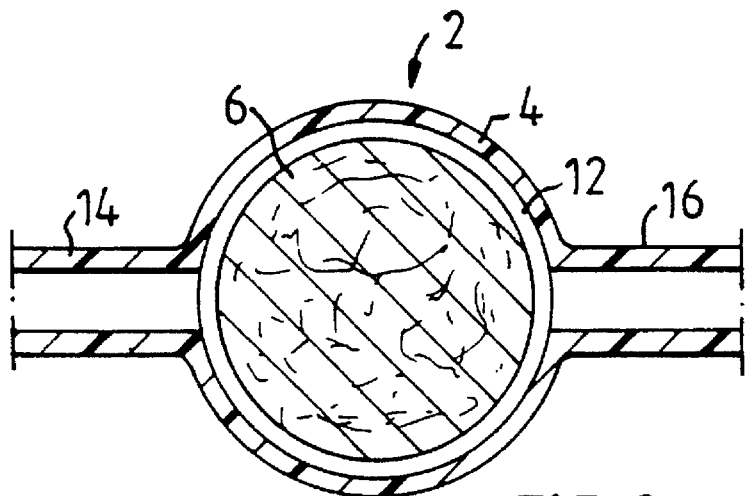
FIG. 2 is a sectional view of the device of FIG. 1 taken along section line A—A.

The dehumidifying device 2 includes, as shown in FIGS. 1 and 2, a container 4 in which a ceramic cylinder 6 is arranged. The ceramic cylinder 6 is fixed in position by a first O-ring 8 and a second O-ring 10 situated between the ceramic cylinder 6 and the walls of the container 4. The space between the ceramic cylinder 6 and the walls of the container 4 forms a gap 12 serving as a flow channel for a flowing gas, expired air from a person in this instance. The flowing gas passes to the device 2 via an inlet 14 and then through the gap 12, whereupon moisture in the flowing gas is picked up by the ceramic cylinder 6. The flowing gas then leaves the device 2 through an outlet 16. The ceramic cylinder can consist of silica gel for maximum fluid and moisture absorption.

The container 4 has a domed underside which is filled with a hydrophilic mat 18. The hydrophilic mat 18 absorbs moisture from the ceramic cylinder 6 and transfers it via openings in the container 4 to a pair of moisture permeable tubes 20. The moisture absorbed by the hydrophilic materials, i.e. the ceramic cylinder 6 and the hydrophilic mat 18, is discharged into ambient air through the moisture permeable tubes 20.

To protect the moisture permeable tubes 20 from external forces, the device 2 is equipped with a protective hood 22 which surrounds the moisture permeable tubes 20. The exchange of air with the ambient atmosphere takes place via openings 24 in the protective hood 22.

The invention is not limited to the described embodiment. For example, the flow channel can pass, as in the prior art, straight through the ceramic cylinder 6. The hydrophilic mat 18 is not absolutely necessary, and can be replaced with silica gel. In addition, the underside of the container could be devised as a membrane made of a moisture permeable material which would then replace the moisture permeable tubes 20. Alternatively, the permeable tubes 20 can be filled with silica gel to enhance the reduction in relative humidity.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a ventilator for supplying breathing gas to a patient a device for reducing the relative humidity of a flowing gas which is warmer than ambient air, comprising:

a container having an inlet and an outlet for flowing gas from which moisture is to be removed;

a flow channel disposed in said container and placing said inlet and said outlet in fluid communication and through which said flowing gas flows in said container;

hydrophilic material disposed in said container and being at least partially surrounded by at least one moisture permeable element directly connected to said hydrophilic material and providing a communication path between said hydrophilic material and ambient atmosphere for permitting evaporative discharge of moisture, adsorbed from said flowing gas into said hydrophilic material, from said hydrophilic material through said moisture permeable element directly into ambient air.

2. A device as claimed in claim 1 wherein said inlet and said outlet have a flow-through area, and wherein said flow channel has a total flow-through area substantially equal to said flow-through area of said inlet and said outlet and wherein said flow channel is disposed in said container for exposing said hydrophilic material to said flowing gas without impeding the flow of said flowing gas.

3. A device as claimed in claim 1 wherein said container comprises a cylindrical container having a first diameter, wherein said hydrophilic material is arranged in a cylinder with a second diameter, said second diameter being smaller than said first diameter, and said hydrophilic material being disposed in a center of said container and thereby forming a gap surrounding said hydrophilic material between said container and said hydrophilic material, said gap comprising said flow channel.

4. A device as claimed in claim 3 further comprising two O-rings securing said hydrophilic material in said center of said container, said O-rings being disposed between said hydrophilic material and said container at opposite ends of said cylindrical arrangement of said hydrophilic material.

5. A device as claimed in claim 1 wherein said moisture permeable element has a first surface through which moisture passes into the ambient air and a second surface attached to said container, and wherein said first surface is larger than said second surface.

6. A device as claimed in claim 5 wherein said moisture permeable element comprises at least one tube having a moisture permeable wall between opposite tube ends with at least one tube end connected to said container.

7. A device as claimed in claim 6 further comprising silica gel filling said tube.

8. A device as claimed in claim 1 further comprising a protective hood disposed around said moisture permeable element and having openings therein for permitting air exchange with the ambient atmosphere.

9. A device as claimed in claim 1 wherein said hydrophilic material comprises a ceramic.

10. A device as claimed in claim 1 wherein said hydrophilic material comprises silica gel.

* * * * *